United States Patent [19]

Stewart et al.

[11] 4,320,856
[45] Mar. 23, 1982

[54] SPHERICAL VACUUM INSULATED CONTAINER

[75] Inventors: Herbert M. Stewart, Nashville; Jack W. La Fevor, Lebanon, both of Tenn.

[73] Assignee: Aladdin Industries, Incorporated, Nashville, Tenn.

[21] Appl. No.: 122,372

[22] Filed: Feb. 19, 1980

[51] Int. Cl.³ .............................................. B67D 5/54
[52] U.S. Cl. ................................... 222/131; 220/423; 222/401
[58] Field of Search ............... 222/131, 183, 184, 209, 222/383, 401; 220/420, 421, 423, 424, 444, 448, 451, 901, 902; 215/12 A, 13 R; 206/524.8

[56] References Cited

U.S. PATENT DOCUMENTS

| 1,551,778 | 9/1925 | Altenberg | 222/423 X |
| 2,144,820 | 1/1939 | Thomas | 215/13 R X |
| 2,776,069 | 1/1957 | Zimmerman | 220/424 |
| 2,845,199 | 7/1958 | Putman et al. | 220/424 |
| 3,009,600 | 11/1961 | Matsch | 220/423 |
| 3,094,448 | 6/1963 | Cornelius | 220/444 |
| 3,204,804 | 9/1965 | Hnilacra, Jr. | 220/423 |
| 3,356,243 | 12/1967 | Piker | 215/13 R |
| 3,845,873 | 11/1974 | Bridges | 215/13 R |
| 3,863,794 | 2/1975 | Hata | 220/421 X |
| 3,910,441 | 10/1975 | Bramming | 215/13 R |
| 3,961,720 | 6/1976 | Potter | 215/13 R |
| 4,113,147 | 9/1978 | Frazier et al. | 221/131 |
| 4,116,366 | 9/1978 | Takenakashima et al. | 222/131 |

Primary Examiner—Mark Rosenbaum
Assistant Examiner—Fred A. Silverberg
Attorney, Agent, or Firm—McDougall, Hersh & Scott

[57] ABSTRACT

This spherical insulated container is constructed from a pair of concentric spheres between which is formed a chamber. Communication of liquids to be thermally insulated within the interior sphere is provided by adjacent openings in each sphere defining a mouth area. Either a thermally insulating cap or pump dispenser seals the mouth of the container. A pump dispenser provides a convenient mechanism for dispensing liquids from a spherically shaped insulated container.

10 Claims, 6 Drawing Figures

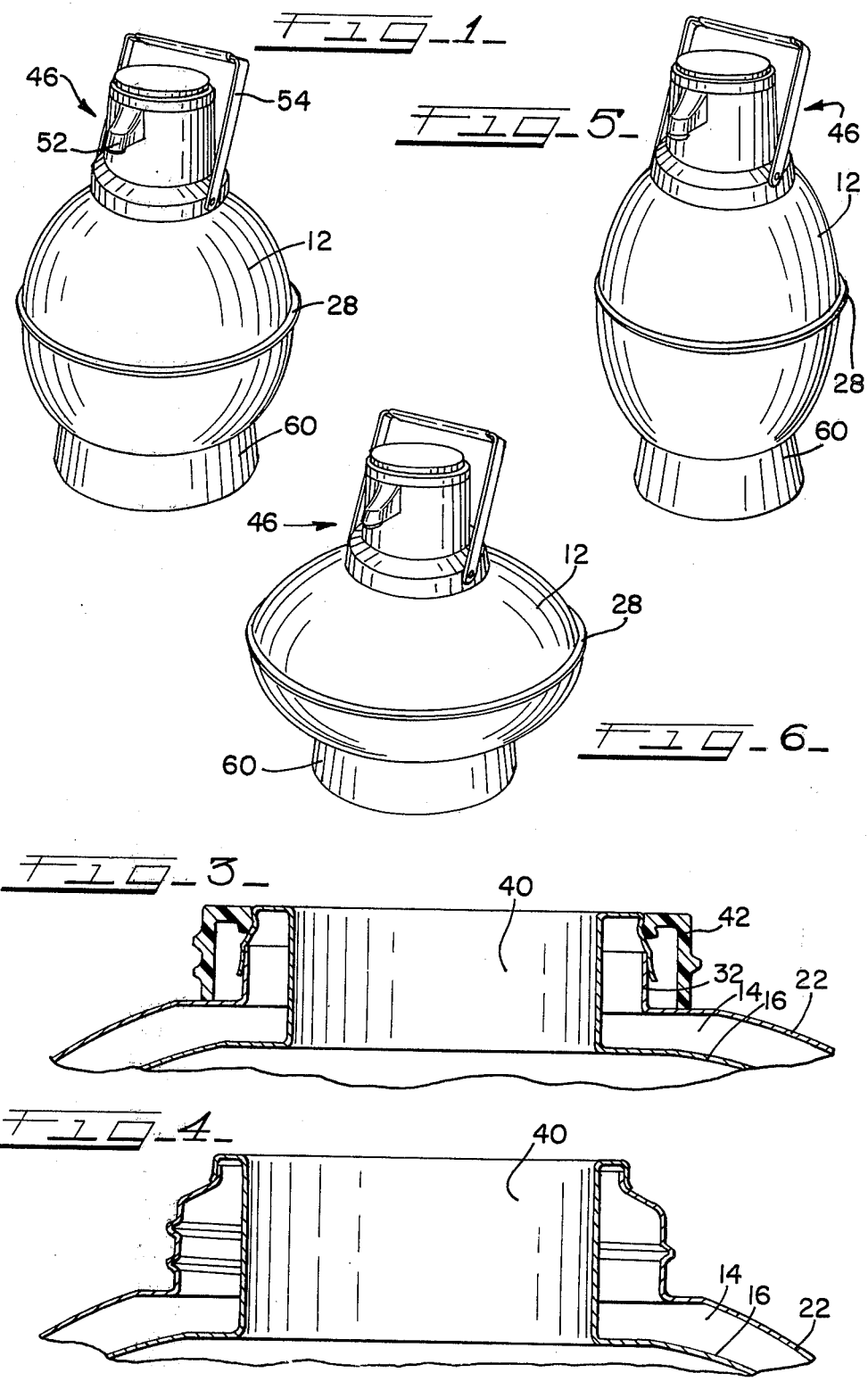

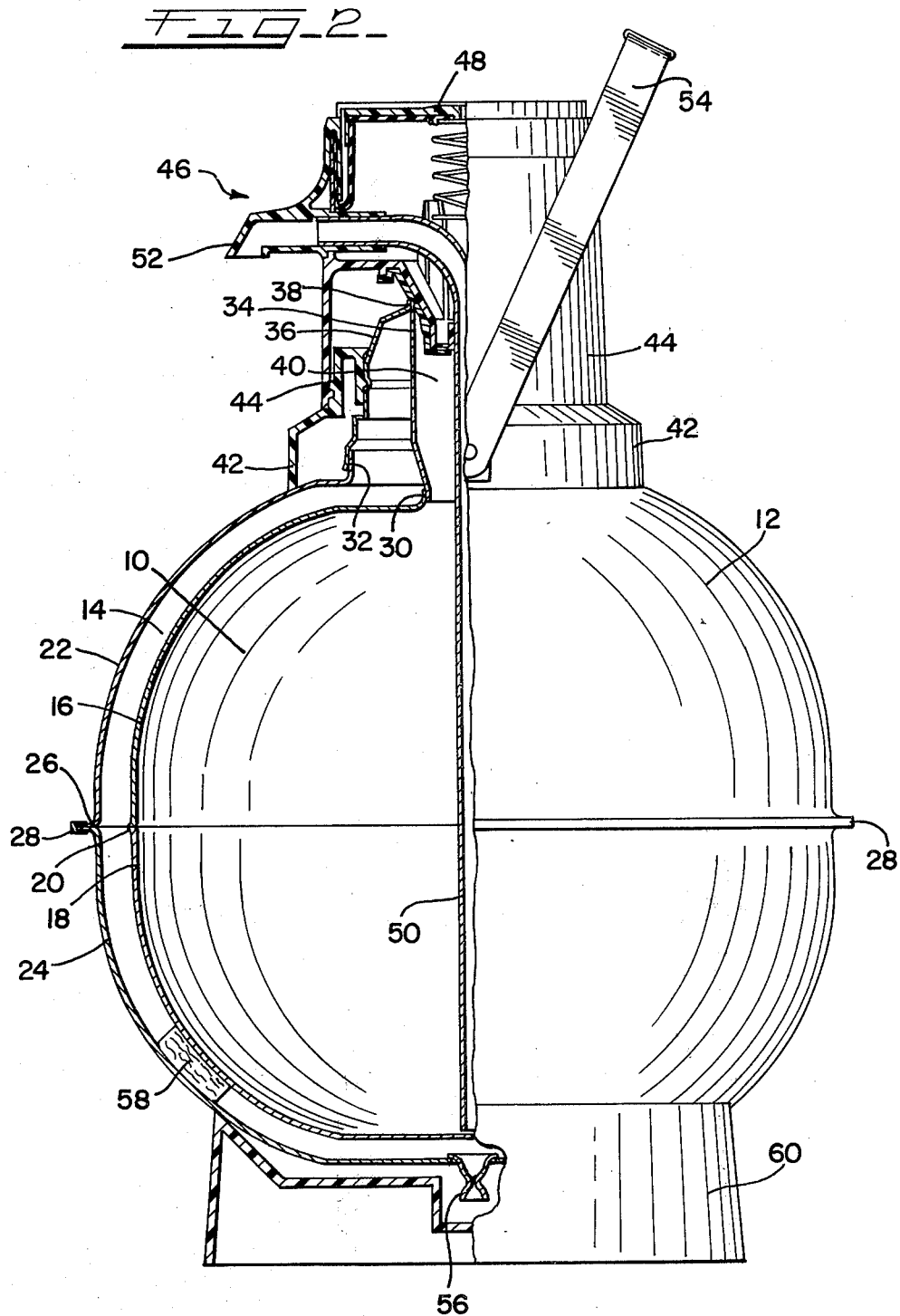

SPHERICAL VACUUM INSULATED CONTAINER

BACKGROUND OF THE INVENTION

The present invention relates in general to the field of maintaining solid and liquid materials at a given temperature relative to a different temperature environment by means of thermally insulating the material in an insulated container. A more specific application of the instant invention relates to the field of maintaining food or beverages at a relatively constant temperature by minimizing thermal losses.

Prior art indicates that for a considerable length of time cylindrical vacuum insulated bottles commonly referred to as Thermos bottles have been utilized to maintain foods and beverages at an initial temperature, either hot or cold. Typically, these containers had a double-walled filler with the space between the walls being evacuated for insulation and mounted within a jacket which provided both additional exterior insulation and protection for the filler. The following United States patents are cited as representative of this type of construction: U.S. Pat. Nos. 3,845,873; 3,910,441; 3,961,720.

Although cylindrical Thermos bottles offer a convenient shape for handling, the cylindrical shape is inferior to that of a spherical container in several respects. A spherical container requires less surface area to enclose a given volume of liquid than does a cylinder. Thus, if a cylinder and a sphere were constructed from equal amounts of material, the sphere would contain a greater volume than would the cylinder. Therefore, to construct a container capable of storing a given volume the use of a spherical shape reduces the amount of material needed as compared with a cylindrical shape. Economy of manufacture is thus enhanced by the use of a spherical container.

The rate of heat loss is directly proportional to the surface area of the container. For a given volume of liquid to be stored, the container having the smallest surface area containing that liquid will provide the smallest heat loss. This, of course, assumes that materials having equal thermal insulating properties are used. Since the sphere offers the smallest surface area container to store a given volume of liquid, it, therefore, follows that a sphere will exhibit a smaller heat loss than would a cylindrical container made of material having equal thermal insulating properties. This means that such a spherical container after a given length of time would maintain its contents more closely to the initial temperature of the contents than would a cylindrical container. Thus, the sphere offers thermal advantages when compared to cylindrical containers.

Another advantage of the sphere is its ability to withstand pressure better than other shapes. The ability to withstand pressure becomes an increasingly important factor as the container size increases. Because a vacuum exists in the chamber between filler walls, atmospheric pressure exerts a force tending to collapse these walls towards each other. Pressure is defined as a force acting upon a given area. Therefore, the total force acting upon the filler walls increases proportionately as the filler surface area increases. A spherical container will therefore be subjected to less total force for a given volume than will a cylindrical container; This follows since the sphere has less surface area as discussed previously.

Another property of the sphere is its ability to withstand large forces normal to its surface without deformation. A larger force normal to the surface of a sphere is required for surface deformation than for the same force applied to a plan constructed of the same material. Similarly, the sphere offers greater resistance to deformation than does a cylinder because a sphere has a radius of curvature in both a horizontal and vertical plane as compared with the cylinder having only a radius of curvature in the horizontal plane. Thus, the spherical vacuum container has an advantage over the cylindrical vacuum bottle in its ability to withstand pressure.

Despite the above advantages, it is not as convenient to pour liquids from the mouth of a spherical container as from one of a conventional cylindrical shape. This is a significant consideration with containers intended for consumer use. A pump dispenser overcomes this disadvantage by eliminating the requirement of tipping a spherically shaped container to dispense liquids.

It is an object of the present invention to provide a substantially spherical vacuum container capable of withstanding greater pressure than cylindrical Thermos bottles.

Additional objects and features of the instant invention include:
(a) economy of material is achieved since less material is needed to construct the instant container;
(b) less heat loss is achieved as compared with a cylindrical container of comparable material;
(c) a given amount of liquid is stored in a smaller volume;
(d) the construction of larger sizes is simplified due to the pressure withstanding properties of the instant invention; and
(e) liquids contained in the instant invention are easily and conveniently dispensed by means of a dispenser pump.

Other objects and advantages of the instant invention will be apparent from the concluding portion of this specification.

SUMMARY OF THE INVENTION

Two concentric spheres having an evacuated chamber therebetween comprise a novel and improved vacuum insulated container. This container can rest either upon a base contoured to its outer spherical surface or rest upon a small portion of its outside surface which has been made planar providing for a stable base. The mouth of the container is thermally sealed either by a conventional cap or by a dispenser pump. A dispenser pump provides convenient means for dispensing liquids from an insulated spherical container.

BRIEF DESCRIPTION OF THE DRAWINGS

FIG. 1 is a perspective view illustrating a spherical container having a base and pump dispenser.

FIG. 2 is a fragmentary side cross-sectional view of the container illustrated in FIG. 1.

FIG. 3 is a fragmentary cross-sectional side view of the mouth illustrating an externally threaded ring for mounting a lid or pump.

FIG. 4 is a fragmentary cross-sectional side view of the mouth illustrating external threads formed on the collar portion.

FIG. 5 is a perspective view illustrating an alternative embodiment of the instant invention having an elliptical cross section with the mouth located along its longer axis.

FIG. 6 is a perspective view of another alternative embodiment of the instant invention, also of an elliptical cross section having its mouth located along the shorter axis of the ellipse.

DETAILED DESCRIPTION

The following detailed description in conjunction with the referenced drawings and remainder of the specification is made so that a person skilled in the art can readily apprehend the instant invention.

Referring to FIGS. 1 and 2, a vacuum insulated container constructed according to the present invention is illustrated. An inner vessel 10 is concentrically located within larger vessel 12 thereby creating a chamber 14 therebetween. Both inner vessel 10 and outer vessel 12 are substantially spherical in shape. Inner sphere 10 is formed by welding upper hemisphere 16 to lower hemisphere 18 continuously about their circumference to form airtight seam 20. Preferably both inner and outer spheres are constructed of stainless steel. Seam 20 is made so that the inside surface of inner vessel 10 adjacent this seam has a minimum of surface contour.

Outer vessel 12 is formed by welding upper hemisphere 22 with lower hemisphere 24 forming a continuous airtight seam 26. A circular protective cap 28 encloses the outward projection of seam 26 to protect users from the possible sharp edges created by this seam.

A vacuum is formed in chamber 14 in order to reduce heat losses due to conduction and convection. A coating is applied to the outside surface of inner-vessel 10 and to the inside surface of outer vessel 12 in order to minimize heat loss across evacuated chamber 14 by radiation.

Inner vessel 10 and outer vessel 12 have adjacent circular openings defined by edges 30 and 32 respectively. A tubular neck 34 is welded uniformly about its circumference on one end to edge 30 of inner vessel 10. The other end of neck 34 is uniformly welded about its circumference to tubular collar 36 thereby forming seam 38. The other end of collar 36 is uniformly welded about its circumference to edge 32 of outer vessel 12. Neck 34 and collar 36 maintain an airtight chamber 14 while providing a mouth 40 for filling and dispensing the interior of vessel 10 with food or beverage.

An outer ring 42 is mounted to upper hemisphere 22 by means of collar 36. Ring 42 is preferably constructed from a plastic-like material which may be mounted either by gluing or by threaded connection with collar 36. A portion of ring 42 is externally threaded to receive the desired structure for sealing and insulating mouth 40. As illustrated in FIG. 2, a dispenser pump 46 is threadedly connected by its outer enclosure 44 to ring 42. Details of construction and explanation of dispenser pump 46 is provided in U.S. Pat. No. 4,113,147 which is hereby incorporated by reference. Briefly, pump dispenser 46 creates pressure internally to inner vessel 10 causing liquid contained in said vessel to be forced up tube 50 and out spout 52 upon manual operation of disc 48. A handle 54 is provided to facilitate movement of the vacuum insulated container.

Chamber 14 is evacuated by means of copper tube 56. One end of copper tube is silver soldered to a hole in the bottom of hemisphere 24 creating the only port connecting chamber 14 with the outside environment. The free end of copper tube 56 is connected to an evacuation pump which substantially evacuates chamber 14 thereby creating a vacuum. While this vacuum is created, a section of copper tube 56 is crimped under sufficient force to cold-weld this section together to form an airtight seal. Thus, a vacuum is created in chamber 14. An asbestos pad 58 is shown in chamber 14 adjacent to the outer surface of the lower inner hemisphere 18 and the inner surface of the lower outer hemisphere 24. A plurality of pads similar to pad 58 is located within chamber 14 acting as stabilizing supports and as getters. As getters asbestos pads 58 tend to chemically remove residual gases that may be remaining in chamber 14.

A base 60 is illustrated in FIG. 2 as supporting a bottom portion of outer vessel 12. A recessed area of base 60 is provided so that the container does not rest upon copper tube 56. Base 60 is preferably constructed from a plastic-like material.

FIG. 3 illustrates an alternative embodiment showing a different means for connecting the inner and outer vessels to form a mouth portion and an alternative mounting ring 42. In this embodiment the upper hemisphere 16 is shown having an extended neck, forming mouth 40. The edges of this neck portion are shown turned radially outward and bent downward to be welded to edge 32 thereby creating a uniform seam maintaining an air-tight chamber 14. This embodiment also illustrates a ring 42 designed to be mounted by gluing or other conventional means to the outer vessel and having external threads for receiving either a conventional insulated cap or pump dispenser 46.

FIG. 4 illustrates another alternative embodiment for forming a mouth 40 and enclosing chamber 14. In this embodiment outer hemisphere 22 is extended outwardly to form a collar section which mates with an extended neck portion of upper hemisphere 16. The extended portion of upper hemisphere 22 is illustrated as being externally threaded for directly receiving either an insulating cap or pump dispenser 46. Therefore, the mounting ring 42 utilized in the previous embodiments to mount an enclosure for mouth 40 is not required.

FIGS. 5 and 6 illustrate the instant invention embodied in a non-perfect spherical shape of elliptical cross section. Although the spherical container illustrated in FIG. 1 maximizes the advantages of the instant invention, the embodiments illustrated in FIGS. 5 and 6 provide these advantages compared with cylindrical vacuum bottles.

Other modifications and embodiments of the instant invention may be made by those skilled in the art without departing from the scope of the subject matter disclosed herein. For example, copper tube 56 used to evacuate chamber 14 could be mounted elsewhere and the flat bottom portion of the outer vessel directly utilized as a base. A conventional thermally insulated cap could be used in place of dispenser pump 46. Other means of attaching dispenser pump 46 or an insulating cap could be employed other than by making threaded connection. Materials other than stainless steel could be used to form the inner vessel, outer vessel or both inner and outer vessel with appropriate means to seal the inner and outer vessel to maintain an evacuated chamber 14. Instead of evacuating chamber 14, one could fill this chamber with a material having thermal insulating properties such as cork, foam, or other suitable materials.

Although the instant invention has been illustrated and described in some detail, this is offered merely by way of example; the instant invention is limited in scope only by the appended claims.

What is claimed is:

1. In combination, an insulated beverage container having a mouth through which beverages pass into and out of the interior of the container and a pump dispenser removably engaging said container and sealing the mouth of said container, whereby beverages within the container are dispensed by said pump dispenser, said insulated container comprising:

a substantially spherical metal inner vessel having an opening for filling and emptying said vessel, a substantially spherical metal outer vessel concentrically enclosing said inner vessel and having an opening aligned with said opening in the inner vessel, a means for forming an airtight seal between said opening in the inner vessel and opening in the outer vessel, forming the mouth, thereby said mouth creating an airtight chamber between said vessels from which air is substantially evacuated, said forming means comprising a metal collar welded to said outer vessel and to a neck connected to said inner vessel adjacent their respective openings, said collar receiving said pump dispenser to secure same to said container, and means for supporting and stabilizing the inner vessel with respect to the outer vessel, wherein said inner and said outer vessels each comprise an upper hemisphere and a lower hemisphere welded together to define a seam, wherein the inside surface of said inner vessel at said seam has a minimum of surface contour, and a separate cap means for enclosing the seam about the outer vessel.

2. The device according to claim 1 wherein said inner vessel is formed of stainless steel.

3. The device according to claim 1 wherein the outside wall of the inner vessel has a coating to reduce the thermal radiation across the chamber.

4. The device according to claim 1 wherein the inside wall of the outer vessel has a coating to reduce thermal radiation across the chamber.

5. The device according to claim 1 wherein said outer vessel has a secondary opening to which an end of a length of tubing is airtightly bonded, the other end of said tubing adapted to be attached to an evacuation pump which substantially evacuates the air from said chamber, a section of said tube crimped to form an airtight cold-weld bond thereby sealing the evacuated chamber.

6. The device according to claim 1 wherein said means for supporting and stabilizing comprises a plurality of pads within said chamber.

7. The device according to claim 6 wherein said pads are made of asbestos.

8. The device according to claim 1 wherein said collar is externally threaded.

9. The device according to claim 1 further comprising a means for maintaining the container in a stable resting position.

10. The device according to claim 9 wherein said means for maintaining the container in a stable resting position comprises a base contoured to receive a portion of the outside surface of the outer vessel.

* * * * *